(12) United States Patent
Alderman (10) Patent No.: US 10,067,352 B2
(45) Date of Patent: Sep. 4, 2018

(54) 3D IMAGE GENERATING LENS TOOL

(71) Applicant: Robert Joe Alderman, Poteet, TX (US)

(72) Inventor: Robert Joe Alderman, Poteet, TX (US)

(*) Notice: Subject to any disclaimer, the term of this patent is extended or adjusted under 35 U.S.C. 154(b) by 528 days.

(21) Appl. No.: 14/842,897

(22) Filed: Sep. 2, 2015

(65) Prior Publication Data

US 2016/0363780 A1 Dec. 15, 2016

Related U.S. Application Data

(60) Provisional application No. 62/230,733, filed on Jun. 15, 2015.

(51) Int. Cl.
| | | |
|---|---|---|
| *G02B 27/22* | (2018.01) | |
| *H04N 13/218* | (2018.01) | |
| *H04N 13/344* | (2018.01) | |
| *G03B 35/00* | (2006.01) | |

(52) U.S. Cl.
CPC ......... *G02B 27/2235* (2013.01); *G03B 35/00* (2013.01); *H04N 13/218* (2018.05); *H04N 13/344* (2018.05)

(58) Field of Classification Search
CPC .... G02B 2027/0112; G02B 2027/0172; G02B 2027/0178; G02B 27/2235; H04N 13/044; H04N 13/0217
See application file for complete search history.

(56) References Cited

U.S. PATENT DOCUMENTS

| | | |
|---|---|---|
| 5,727,242 A | 3/1998 | Lo |
| 6,269,223 B1 | 7/2001 | Lo |
| 8,363,156 B2 | 1/2013 | Lo |
| 8,608,325 B2 | 12/2013 | Lo |
| 8,633,989 B2 | 1/2014 | Okuda |
| 8,902,289 B2 | 12/2014 | Yun-Chin |
| 8,902,295 B2 | 12/2014 | Bickerstaff |
| 8,928,738 B2 | 1/2015 | Wenge |
| 8,982,181 B2 | 3/2015 | Newbery |
| 9,055,282 B2 | 6/2015 | Inomoto |
| 2007/0252989 A1* | 11/2007 | Comstock ............. G01J 3/02 356/328 |
| 2009/0215533 A1* | 8/2009 | Zalewski ............. A63F 13/00 463/32 |
| 2014/0085615 A1* | 3/2014 | Pretorius ............ H04N 9/3126 353/99 |
| 2014/0118813 A1* | 5/2014 | Amitai ............... G02B 6/0035 359/246 |
| 2014/0354782 A1 | 5/2014 | Lowry |
| 2014/0240346 A1* | 8/2014 | Kawaguchi .......... G09G 5/377 345/629 |
| 2016/0363776 A1* | 12/2016 | Zhong ................. G02B 5/10 |

* cited by examiner

*Primary Examiner* — Sultan Chowdhury
(74) *Attorney, Agent, or Firm* — Law Office of William F. Ryann (57) ABSTRACT

A tool for capturing a three dimensionally viewable image. The tool includes multiple reflective surfaces for generating one view of a scene whereas another view of the same scene from a slightly different location is obtained free of the reflected surfaces. Both views may be simultaneously captured by the lens and displayed together in a single image. Thus, a variety of sterographic techniques may be utilized for viewing the image in a three dimensional manner.

26 Claims, 6 Drawing Sheets

FIG. 6

3D IMAGE GENERATING LENS TOOL

PRIORITY CLAIM/CROSS REFERENCE TO RELATED APPLICATION(S)

This Patent Document claims priority under 35 U.S.C. § 119 to U.S. Provisional App. Ser. No. 62/230,733, filed Jun. 15, 2015, and entitled, "Cell Phone 3D Camera", which is incorporated herein by reference in its entirety.

BACKGROUND

Stereoscopy or stereoscopics is a field often associated with three dimensional (3D) imaging, photography and/or film to the common everyday viewer. That is, whether an image is on a movie screen, a holographic still, or utilized with an old-fashioned View-Master®, the techniques involved in generating and viewing the image are often taken from the field of stereoscopy. It is of note that, as detailed below, stereoscopy involves the illusion of 3D via multiple images viewable in a simultaneous fashion. Thus, as used herein, the terms "3D" or "3 dimensional" are meant to encompass stereoscopic techniques and imaging such as side-by-side views of the same scene, setting aside debate as to whether such illusionary techniques truly constitute "3D". For purposes herein, such may be referred to as "3D".

At the fundamental level, stereoscopy is directed at creating an illusion of depth which mimics the depth that is otherwise perceptible with a pair of eyes. Specifically, depth perception is a result of the fact that, when viewed by a pair of eyes, a given scene is actually the result of separate views of the same scene. For example, in the case of an average human, the two separate views, one from each eye, are obtained from two different locations that are between about 2 and 3 inches apart from one another. That is, the average spacing between human eyes is about 2.6 inches. Regardless, these two separate views of the same scene are processed by the human mind simultaneously in a manner that provides a perception of depth to the overall scene, thus yielding a live 3D rendering from the viewer's vantage point.

With the above in mind, basic stereoscopy involves the generating of a side-by-side, dual view image or "stereogram" of a given scene that is then generally viewed with a viewer. The viewer is utilized to help the user see the right view only with the right eye and the left view only with the left eye. In this manner, the viewer serves as a binocular aid to allow the user to see the image in 3D. The above referenced View-Master® is a traditionally common form of such a viewer and system which has been around since the late 1930's. However, other types of viewers and stereograms were around as early as the mid-1800's, even pre-dating commonly available photography.

Alternate forms of stereoscopy have been developed throughout the years. For example, freeviewing without a viewer may be utilized whereby the user employs a cross-eyed technique or attempts to look "through" the image while looking at the multiple views of the scene in order to perceive a 3D appearance. Further, more sophisticated types imaging beyond side-by-side views of a scene may be utilized. For example, conventional 3D movies often involve multiple superimposed polarized views of images such that a pair of glasses may be worn where one lens blocks out one of the polarized views and the other blocks out the other. Thus, a 3D effect may be perceived by the user. Sophistication levels may be much more increased with techniques such as autostereoscopy, holography and others which do not require the use of a viewer and render a higher degree of realism from the user's perspective.

The more sophisticated forms of stereoscopy may render a more realistic 3D experience for the user. However, the techniques are also much more detailed and costly. As opposed to two side-by-side views, they may require many more views of the same scene, computerized synchronization and other added effort for an effective rendering. Alternatively, at the opposite end of the spectrum, freeviewing by straining the eyes in a cross-eyed or other manner is also generally an impractical endeavor. Indeed, apart from 3D theater shown movies, for the everyday user, the basic side-by-side, viewer-assisted, 3D experience generally remains the most practical option.

Unfortunately, while viewer-assisted 3D stereoscopy remains quite practical and popular, the actual process for 3D imaging remains largely outside of the user's control. That is, even though today's user is often equipped with a smartphone giving the user near round the clock picture and video making ability, there remains no practical mode of generating these images in a 3D viewable fashion with a commonly available smartphone. Instead, images obtained through the smartphone are of a standard 2D variety as would be expected given the single lens with which the smartphone camera is equipped. Adding a lens to a pre-manufactured smartphone solely for the sake of 3D viewing seems impractical. Even though basic side-by-side stereoscopy remains practical, the user's own ability to determine what images are available for viewing in this manner is not. This is noteworthy given the ease at which the user is otherwise able to determine and control imaging given the emergence of readily available smartphone and other mobile imaging tools.

SUMMARY

An imaging tool is provided for securing, attaching, integrating, or otherwise using with a lens of a camera to generate a three dimensionally viewable image. The tool includes a first reflective surface that is positioned at a location adjacent the lens, along with a second reflective surface that is located adjacent the first reflective surface. Thus, the lens may capture the three dimensionally viewable image which includes a first view of a scene free of the reflective surfaces and a second view of the scene by way of reflection via the surfaces.

BRIEF DESCRIPTION OF THE DRAWINGS

Implementations of various structure and techniques will hereafter be described with reference to the accompanying drawings. It should be understood, however, that these drawings are illustrative and not meant to limit the scope of claimed embodiments.

DETAILED DESCRIPTION

In the following description, numerous details are set forth to provide an understanding of the present disclosure. However, it will be understood by those skilled in the art that the embodiments described may be practiced without these particular details. Further, numerous variations or modifications may be employed, which remain contemplated by the embodiments as specifically described.

Embodiments are described with reference to particular tools for use with lenses of particular types of mobile devices. Specifically, monolithic straight angle and wide angle assemblies are shown along with those of a collapsible variety for use with standard lenses of smartphone mobile devices. However, a variety of other tool configurations, lenses and/or mobile devices may take advantage of the principles detailed herein. For example, an imaging tool may be neither monolithic nor collapsible, the lenses may be more complex than that found in a conventional smartphone. Indeed, the mobile device itself may be a digital camera, laptop or any other number of device types utilizing a lens for sake of imaging. So long as the imaging tool itself incorporates separate reflective surfaces for positioning relative the lens and one another for sake of enabling the generation of a three dimensionally viewable image, appreciable benefit may be realized. It is of note, that as used herein, the term reflective "surface" is not meant to require that such surface constitute an exposed or outer surface. Indeed, in addition to embodiments detailed herein, such a surface may be a layer(s) with reflective character, perhaps even located embedded within or sandwiched by other materials.

Figure 1:
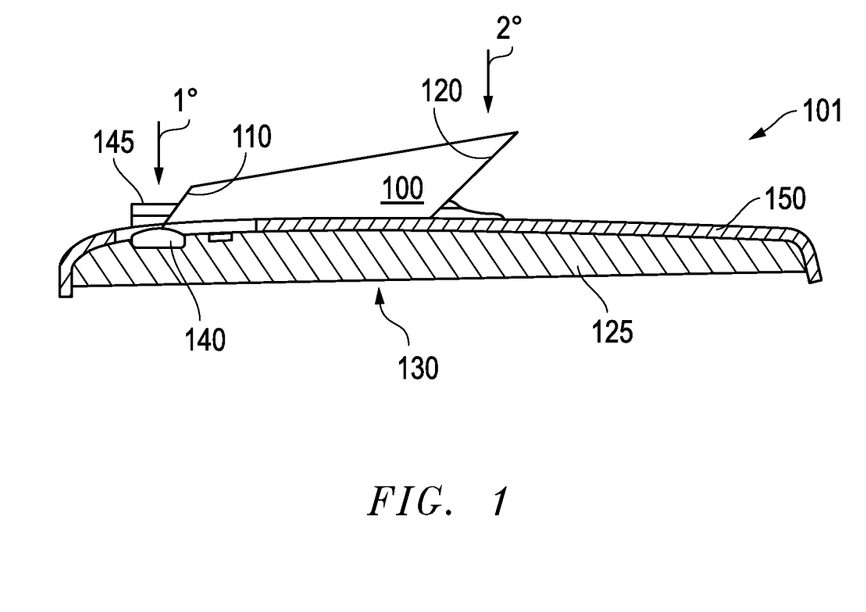
FIG. 1 is a sectional side view of a mobile device accommodating an embodiment of an imaging tool for a lens thereof to generate a three dimensionally viewable image.

Referring now to FIG. 1, a sectional side view of a mobile device assembly 101 accommodating an embodiment of an imaging tool 100 is shown. Specifically, the tool 100 is configured for interfacing a lens 140 of a mobile device 125 in the form of a smartphone. Thus, the tool 100 may be utilized to help generate a three dimensionally viewable image, such as that shown in FIG. 4 at the screen 130 of the device 125. That is, while the mobile device 125 incorporates a single lens 140 for sake of generating the image of FIG. 4, the image itself is made up of two separate views 430, 435 of this same scene. Specifically, due to the noted interfacing of the imaging tool 100 with the lens 140 this image may be of a particular dual nature that is viewable in a three dimensional manner as detailed further herein.

As indicated, in the embodiment shown, the mobile device 125 is a conventional smartphone. However, as also indicated above, the device 125 may be any portable device with a lens 140 and image capturing ability including a digital or even non-digital camera, a laptop computer, electronic tablet or any number of other device types. Indeed, the word "mobile" in the term "mobile device" is only meant to infer that the device is likely to be transported by hand in comparatively mobile fashion. This may be in contrast to a more stationary or cumbersome device, such as a desktop computer or a camera system for a movie set, where the addition of an added lens and/or camera for sake of three dimensional imaging might be more likely. Nevertheless, a single-lens 140 mobile device 125 may take advantage of embodiments and techniques relative the imaging tool 100 to generate three dimensional viable images, as indicated above and detailed below.

Continuing with reference to FIG. 1, the mobile device assembly 101 includes a smartphone device 125 that is provided with a protective case 150. However, in the embodiment shown, in addition to serving as a conventional protector for the secured device 125, the case 150 is outfitted with a securing mechanism 145 for securably immobilizing the imaging tool 100 in place. As shown in FIG. 1, the imaging tool 100 may be a single monolithic optical grade acrylic-based material or other suitable substantially transparent material but with reflective surfaces 110, 120 at either end thereof as detailed below. Further, in the embodiment of FIG. 1, when properly positioned and secured by the case 150, the imaging tool 100 is aligned with the lens 140 in such a manner that about half of the lens 140 is covered by the tool 100.

Figure 4:
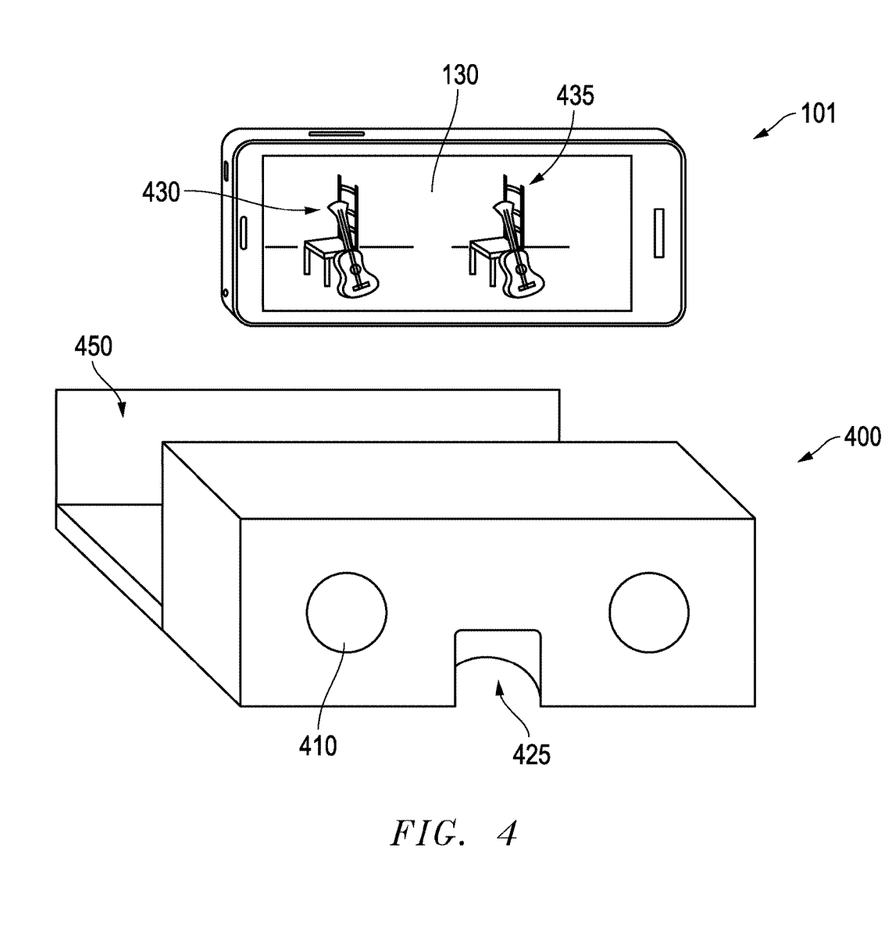
FIG. 4 is an embodiment of a system for viewing the three dimensionally viewable image generated by the lens with the imaging tool of FIG. 1 and displayed by the mobile device.

With added reference to FIG. 4, the other half of the lens 140 remains uncovered by the tool 100 for capturing a view 430 obtained from a primary image path (see arrow 1°). However, another "reflection" view 435 of the same scene via the lens 140 may be simultaneously captured from a secondary image path (see arrow 2°). For this view 435, the secondary image path 2° is one that is of a reflected nature. Specifically, a first reflective surface 110 is adjacently angled over the lens 140 whereas a second reflective surface 120 is positioned adjacently facing the first 110 (and roughly and at a similar angle as detailed below). Thus, the second reflective surface 120 is oriented to reflect a view of the scene to the first reflective surface 110 which in turn reflects the view 435 to the lens 140. Therefore, with added reference to FIG. 5A, the secondary image path 2° spans from the outside scene to be captured, to the second reflective surface 120/520, to the first reflective surface 110/510 and ultimately through the lens 140.

For embodiments such as these where about half of the lens 140 is covered by the imaging tool 100 to generate the two view image of a scene as shown in FIG. 4, the views 430, 435 will be roughly identical but obtained from slightly different positions. That is, while the second reflective surface 120 initially reverses the image, it is reversed yet again by the first reflective surface 110. Once more, the slight position difference is due to the distance separating the uncovered portion of the lens 140 from the more distant second reflective surface 120. This is also illustrated by reference to the distance separating the image paths 1°, 2° (see also FIGS. 5A-5C). Ultimately, as also detailed below, with two nearly identical views 430, 435 captured from slightly different locations, a perception of depth and three dimensional viewing may be obtained by a user, for example, with the aid of a viewer 400 (see FIG. 4).

It is of note that the viewer 400 of FIG. 4 may be foregone where another form of eye focusing is utilized. For example, if the views 430, 435 are reversed with the right eye view 435 placed at the left of the image and the left eye view 430 placed at the right, the user may use a freeviewing cross-eyed technique for three dimensional viewing of the image. Switching the positions of the views 430, 435 may be obtained by shifting the imaging tool 100, for example to a location further to the left in the embodiment shown so as to completely over the lens 140 to the point where the trailing edge 325 of the first reflective surface 110 is located at about the midline of the lens 140 (see FIG. 3). Thus, the primary image path 1° (for the left eye view 430) would now be obtained through the right side of the lens 140. By the same token, the secondary image path 2° (for the right eye view 435) would now be obtained through the left side of the lens 140. With reference to the image displayed at the screen 130 of FIG. 4, the effect might not be immediately noticeable to a user. However, in place of utilizing a viewer 400, an attempt by the user to first cross his or her eyes when looking at the image would reveal a three dimensional appearance where the image is generated in this fashion with the first reflective surface 110 oriented as indicated relative the lens 140.

Figure 2:
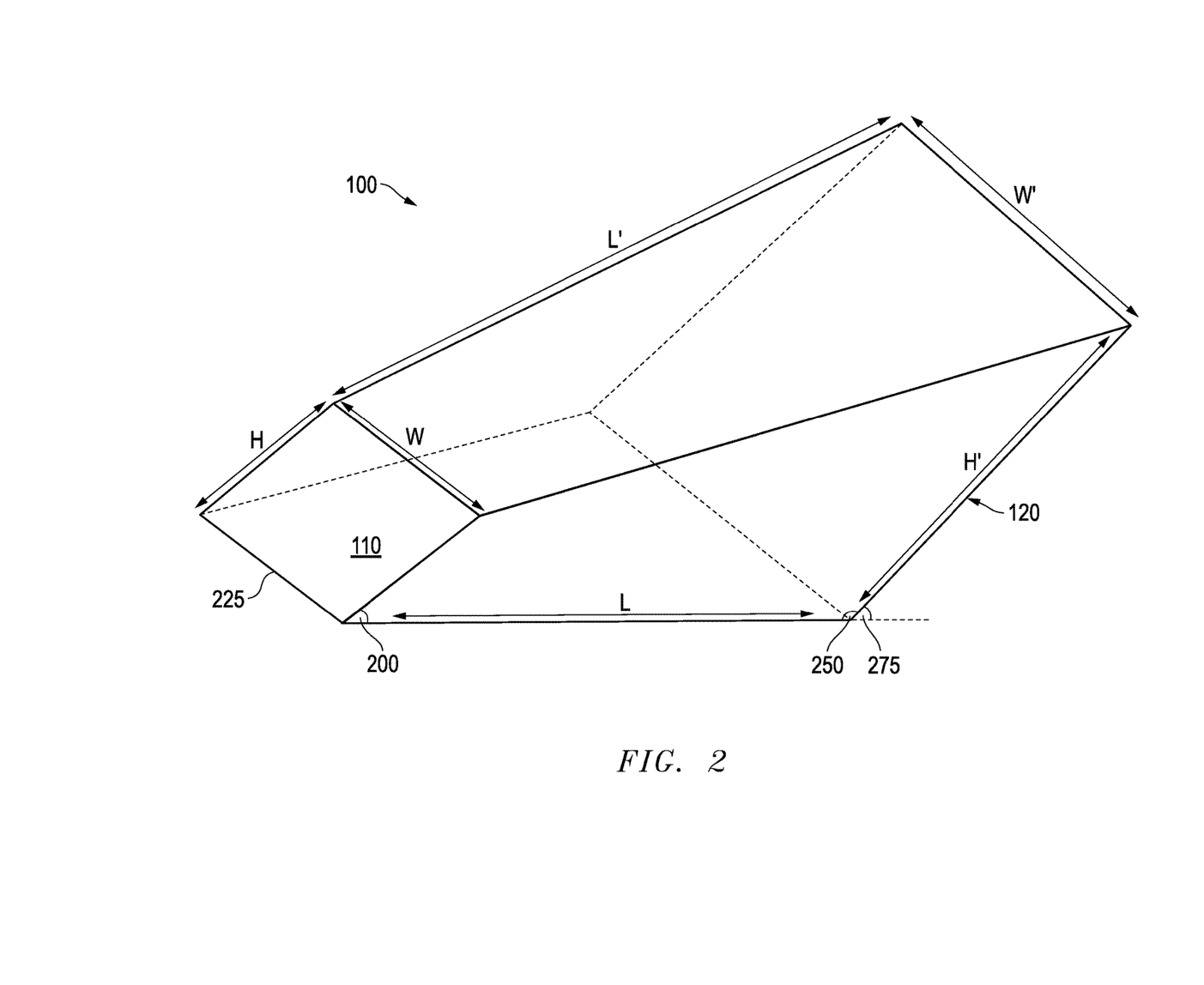
FIG. 2 is a perspective view of the imaging tool of FIG. 1, revealing an embodiment of dimensions therefor.

Referring now to FIG. 2, a perspective view of the imaging tool 100 of FIG. 1 is shown, highlighting potential comparative dimensions and architecture therefor. While a variety of different materials are possible, for the embodiment depicted, a solid clear optical grade acrylic may be utilized. Additionally, the outside exposed surface of each of the reflective surfaces 110, 120 may be "silvered" or mirrored to provide the reflective character thereto. For example, in one embodiment, an aluminum deposition technique is utilized to provide reflective character to the surfaces 110, 120. Once more, the leading edge 225 of the tool 100 may be sawed, beveled or otherwise provided with a substantially fine point. In this way, the degree of distortion or visual interference by edge 225, when positioned directly over the midline of the lens 140 of FIG. 1, may be kept to a minimum. Further, to the extent that any distortion is apparent, when viewed in a three dimensional manner, the distortion is shifted to the sides of the image and is not actually apparent at the center. Thus, for this added reason, from the user's perspective, the distortion is negligible.

in the embodiment of FIG. 2, the tool 100 is about 1 inch long (L) or less at its base and between about 1.25 inches and 1.5 inches at its longest edge (L') thereabove. This allows the tool 100 to be relatively compact in overall profile. However, in other embodiments, the base (L) may be between about 2.25 inches and about 2.75 inches. This embodiment may be less compact with larger surfaces 110, 120 due to the increased base length (L). However, the distancing may correspond to a standard human pupillary distance, generally about 2.6 inches, ultimately enhancing the overall three dimensional viewing effect described further below. It is of note that the added distance of the secondary image path 2° due to the base length (L) may result in the reflected view (e.g. 435 at FIG. 4) being slightly smaller. However, from a user's perspective, the size difference is not only negligible but imperceptible when the image is viewed in a three dimensional manner as shown in FIG. 4.

With the distancing between the reflective surfaces 110, 120 established by the base (L) and thus determinative of the distancing for the image paths 1°, 2° as shown in FIG. 1, other dimensions of the imaging tool 100 may be determined. For example, with added reference to FIG. 1, in order to span a standard ⅜ of an inch smartphone lens 140, the first reflective surface 110 may be a little over about ½ an inch in width (W) and/or height (H) with a primary reflective angle 200 that is a little over 45° (perhaps at about 47°). With a corresponding secondary reflective angle 250 of about 118° for the secondary reflective surface 120 (or about 62° as measured from the opposite side angle 275), a secondary image path 2° via the reflective surfaces 110, 120 may be established as described above. That is, these angles 200, 250 are interdependent and determined in a fashion tailored to one another. With these angles 200, 275 and length of the base (L) in mind, the dimensions of the imaging tool 100 may be further determined. For example, the larger second reflective surface 120 may be about 1.25 inches in width (W') and/or height (H') in order to ensure a full visual interfacing with the smaller first reflective surface 110 for sake of the secondary image path 2°. That is, even though the first surface 110 is smaller, it is distanced by about an inch along the length of the base (L). Thus, for a full field of view interfacing between the reflective surfaces 110, 120, the second surface may be enlarged to the extent noted. Lastly, with the other dimensions and angles 200, 250, 275 of the imaging tool 100 set, the top surface may result in a length (L') of between about 1.25 and about 1.5 inches.

Figure 5A:
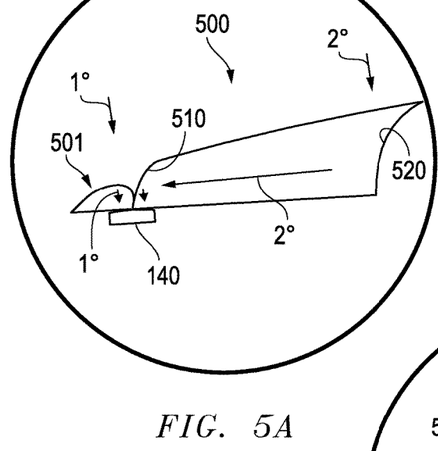
FIG. 5A is a side view of an alternate embodiment of an imaging tool for a lens of a mobile device to generate a three dimensionally viewable image in a wide angle fashion.

Of course, there is no particular requirement that these particular dimensions be utilized for the imaging tool 100. Factors related to the size of the lens 140 and the desired base length (L) may be largely determinative. However, in other embodiments, the imaging tool 100 may not take the form of a purely straight sided obtuse trapezoid, for example, as shown in FIG. 5A. Thus, a variety of other dimensional factors may play a role.

Figure 3:
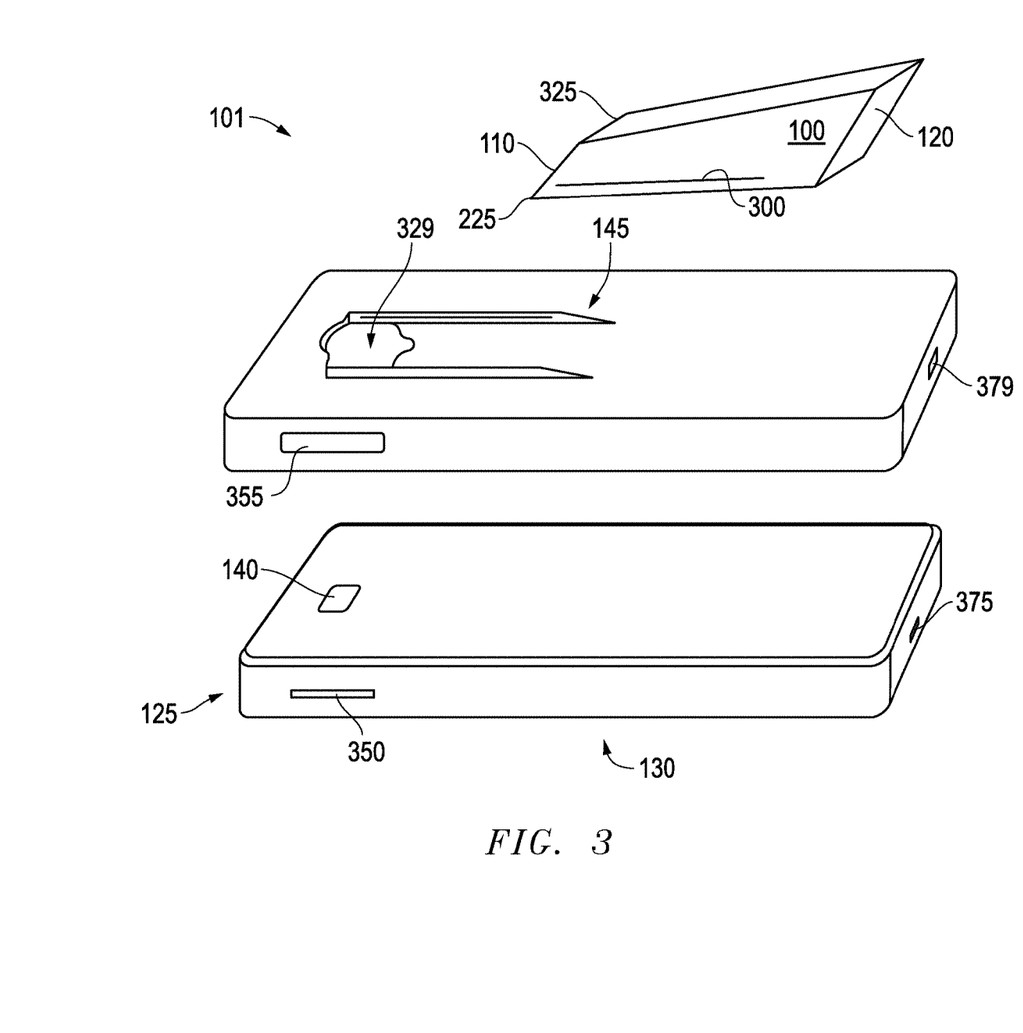
FIG. 3 is an exploded view of the mobile device and imaging tool of FIG. 1, revealing an embodiment of the accommodating by the mobile device.

Referring now to FIG. 3, an exploded view of the mobile device assembly 101 is shown. In this exploded view, the relationship between the mobile device 125, protective case 150 and imaging tool 100 of FIG. 1 are all apparent. The case 150 in particular serves as an interface platform between the device 125 and the imaging tool 100. For example, with respect to the device 125, the case 150 may include a data/charge opening 379 and a depressible locale 355 for aligning with a data/charge port 375 and a volume button 350 of the device 125. Of course, other interface supports beyond the noted opening 379 and locale 355 may be found at the case 150 to allow external interaction with the device 125 via the case 150. Indeed, even in the absence of the imaging tool 100, the camera opening 329 allows for the lens 140 of the device 125 to be utilized without being blocked by the body of the case 150.

Continuing with reference to FIG. 3, the camera opening 329 is also located in alignment with the securing mechanism 145 for the imaging tool 100. Specifically, the mechanism 145 itself is configured to align the imaging tool 100 with the camera opening 329 as it is received and secured to the case 150 thereby. Thus, the securing mechanism 145 is aligned with the opening 329 in a manner that allows for this to take place. In the embodiment shown, this is achieved through the use of receiving tracks that matchingly receive grooves 300 of the imaging tool 100. Once more, the morphology of the case 150 and opening 329 may include a stop to ultimately determine the final secured alignment of the tool 100 relative the underlying lens 140. For example, considering that the tool 100 and opening 329 are both wider than the lens 140, a shaped protrusion or sharp narrowing of the opening 329 may be sufficient to serve as a stop for the tool 100 without covering or interfering with the lens 140 and its field of view. Of course, in other embodiments securing and aligning aids other than grooves 300 with a stop may be utilized. For example, the body of the case 150 may be configured to receive and secure the imaging tool 100 in a snap-fit or magnetic mounting fashion.

As indicated above, secure alignment of the tool 100 for sake of generating a three dimensionally viewable image would result in either the leading edge 225 or the trailing edge 325 of the first reflective surface 110 being positioned roughly over about the midline of the lens 140. That is, for generating an image most suitable for viewing with a viewer 400 as shown in FIG. 4, the leading edge 225 would be located at the midline of the lens 140 when secured in position by the case 150 and securing mechanism 145. Thus, a more direct, reflection-free view 430 of a scene may be generated via the left, uncovered portion of the lens 140 whereas a reflection based view 435 via the reflective surfaces 110, 120 would be generated via the right, covered portion of the lens 140. Alternatively, however, in an embodiment where the tool 100 may be secured by the case 150 and mechanism 145 with the trailing edge 325 adjacently over the midline of the lens 140, these views 430, 435 may be reversed. Specifically, the reflection-based view would then be to the left and the view free from reflection would be to the right. Thus, the user may use a "freestyle" or free-viewing cross-eyed approach for focusing for sake of a three dimensional viewing experience in lieu of a viewer 400.

Referring specifically now to FIG. 4, the above referenced system for viewing the three dimensionally viewable image generated by the lens 140 and imaging tool 100 of FIGS. 1-3 is shown. As noted, the mobile device screen 130 shows two views 430, 435 of the same scene which are taken from slightly different perspectives or locations. That is, as described above, in the embodiment shown, the left view 430 is obtained free from any reflection whereas the right view 435 is obtained from a location further to the right via the second reflective surface 120 of the tool 100 (see FIGS. 1-3).

With the dual image obtained and displayed on the screen 130, the mobile device assembly 100 may be placed in a tray 450 of a viewer 400 to aid a user in the three dimensional viewing experience. Specifically, the viewer 400 may be a conventional stereoscope to accommodate a standard sized smartphone. The viewer 400 is shown equipped with a nose guide 425 and two separate focusing non-magnifying monoculars 410 to allow the user to view the picture he or she may have just taken in a three dimensional fashion. While the three dimensional aid of the embodiment of FIG. 4 is a stereoscope viewer 400, other types of viewing aids may be utilized. For example, a glasses clip-on device for focusing a user's eyes relative the image at the screen 130 may be utilized. Alternatively, the "viewer" may be in the form of a parallax barrier at the screen itself so as to provide the user with a three dimensional viewing experience.

Figure 5B:
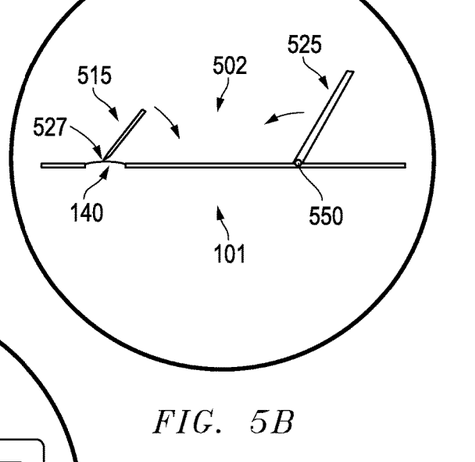
FIG. 5B is a side view of an embodiment of a collapsible imaging tool for a lens of a mobile device to generate a three dimensionally viewable image.
Figure 5C:
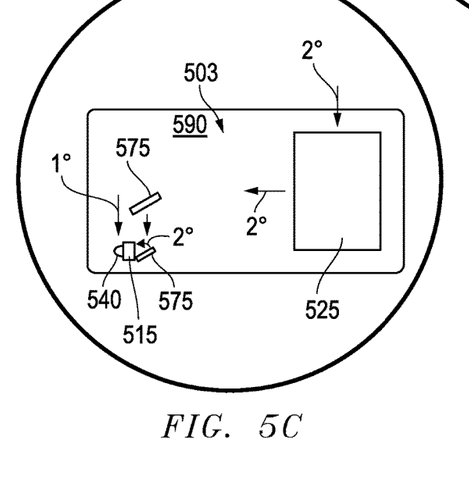
FIG. 5C is a top view of an alternate embodiment of an imaging tool for an offset lens of a mobile device to generate a three dimensionally viewable image.

Referring now to FIGS. 5A-5C, alternate embodiments of imaging tools 500, 502, 503 are shown. Specifically, FIG. 5A is a side view of an imaging tool 500 to help to generate a three dimensionally viewable image in a wider angle fashion. FIGS. 5B and 5C are embodiments of imaging tools 502, 503 with first and second reflective surfaces that are individual mirrors 515, 525 as opposed to being the ends of a solid monolithic, otherwise transparent, block. Specifically, in FIG. 5B, the mirrors 515, 525 are inwardly collapsible. In the embodiment of FIG. 5C, the mirrors 515, 525 may also be collapsible and are offset from one another to account for a lens 540 that is not centrally located. That is, with a camera lens 540 of the device 590 being in a corner, intermediate mirrors 575 may be utilized to steer the secondary path 2° from the second reflective surface 525 to the first 515.

With specific reference to FIG. 5A, the image tool 500 is of a unique morphology. Specifically, the second reflective surface 520 is convex, which may widen the view as it traverses the secondary path 2°. However, the first reflective surface 510 is concave, thereby taking the wider view and reducing it to a manageable level before it reaches the lens 140. Using this type of convex and concave technique in guiding the secondary path 2°, may provide unique advantages. For example, an overall wider field of view may be obtained for each view 430, 435 that is obtained (see FIG. 4). Thus, the fact that the three dimensionally viewable image is in effect cut in half, due to its repeating double nature may be compensated for to a degree. In this regard, notice that in the embodiment of FIG. 5A, a wide angle lens adapter 501 is incorporated into the tool 500 for alignment with the primary path 1°. In this manner, this view 430 will also be widened to substantially the same extent as the view 435 via the secondary path 2° as noted. Another advantage to this convex/concave technique for image generating is that the overall profile of the imaging tool 500 may be substantially reduced. Specifically, in one embodiment, at its highest point near the trailing edge of the second reflective surface 520, the profile or height of the tool 500 is substantially below the distance between the surfaces 510, 520. Thus, a more compact and user friendly tool 500 is provided.

Continuing with reference to FIG. 5A, the monolithic imaging tool 500 may incorporate the lens 140 as part of a single unit. In fact, whether more of a straight angle variety (e.g. tool 100) as shown in FIGS. 1-3 or as shown in FIG. 5A here, the tool 100, 500 may include the lens 140 as part of a single monolithic piece as opposed to the lens 140 and the tool 100, 500 being separately provided. Nevertheless, the first reflective surface 110 (or 510) would still be considered located at a position adjacent the lens 140, only now with the lens 140 being incorporated into the tool 100, 500 and with other features of the tool 100, 500 oriented as detailed herein.

Referring specifically now to FIG. 5B a side view of an embodiment of a collapsible imaging tool 502 is shown. In this embodiment, the tool 502 includes individual mirrors 515, 525 as noted above. In terms of user friendliness, this may allow the tool 502 to remain a part of the mobile device assembly 101 on a more permanent basis. That is, the user may fold the mirrors 515, 525 in an inward fashion when not in use, as opposed to regularly taking the tool 502 off when not in use.

In the embodiment of FIG. 5B, the leading edge 527 of the first mirror 515 is sharpened and beveled to minimize the amount of potential image interference at the lens 140 as detailed above. Other features of this embodiment may include the use of bi-stable hinges 550 that allow the mirrors 515, 525 to be secure and stable at different positions (e.g. collapsed or at the appropriate viewing angles as depicted). Indeed, the hinges 550 or the mirrors 515, 525 may also be spring loaded and/or outfitted with a friction lock to allow the user to easily move between the collapsed and expanded viewing mode as shown.

Referring now to FIG. 5C, a top view of an alternate embodiment of an imaging tool 503 is shown that is configured for use with an offset lens 540 of a mobile device 590. That is, due to the offset nature of the lens 540, intermediate mirrors 575 may be positioned between the first 515 and second 525 mirrors. Specifically, the intermediate mirrors 575 are oriented to steer the secondary path 2° from the second mirror 525 to the first mirror 515 which is required to be offset due to the offset location of the lens 540, a common feature in some popular smartphones. Again, this embodiment may incorporate a variety of features such as spring loaded hinges with any or all of the mirrors 515, 525, 575 being collapsible. It is also of note that the intermediate mirrors 575 are even in number (i.e. two). In this way the view that is provided to the lens 540 along the secondary path 2° is not reversed. Along these lines, in other embodiments, additional intermediate mirrors 575 may be utilized. However, to ensure a three dimensionally viewable image is ultimately rendered, the intermediate mirrors may continue to be even in number (e.g. two, four, six, etc.).

Figure 6:
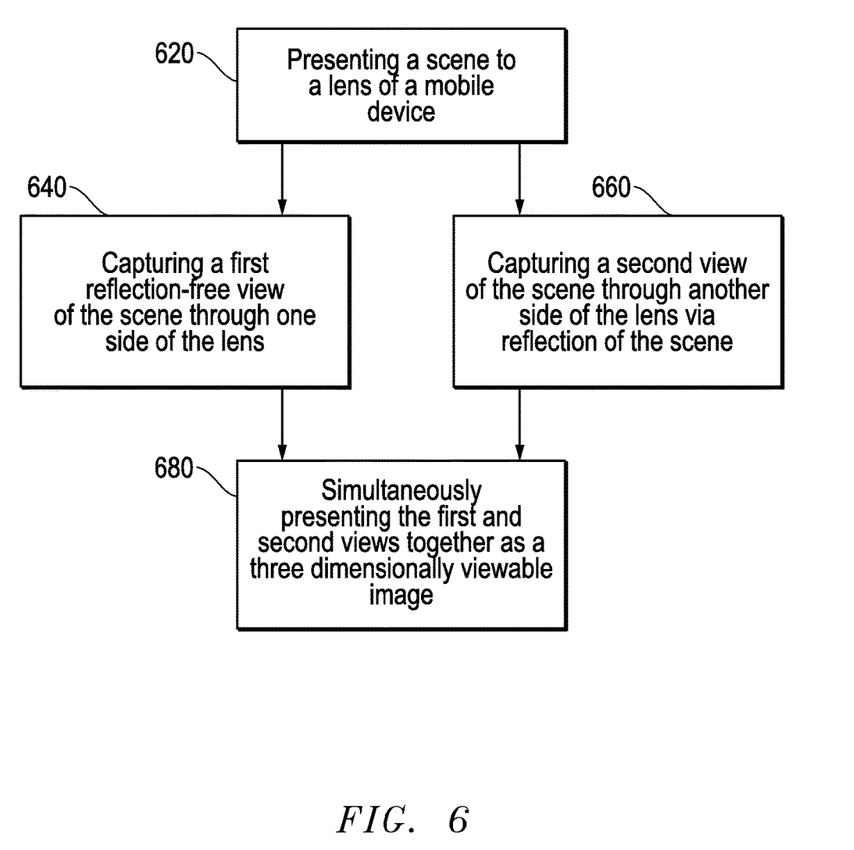
FIG. 6 is a flow-chart summarizing an embodiment of utilizing an imaging tool with a lens of a mobile device to generate and view a three dimensionally viewable image.

Referring now to FIG. 6, a flow-chart summarizing an embodiment of utilizing an imaging tool with a lens of a mobile device to generate and view a three dimensionally viewable image is shown. Specifically, as detailed above, a scene may be presented to a lens of a mobile device and a picture taken as indicated at 620. However, with the imaging tool of the embodiments detailed herein, taking a picture includes capturing a first view of the scene through one side of the lens free of any reflection (see 640) while also capturing another view of the scene through another part of the lens via reflection (see 660). Of course, reflection-free is not meant to infer that the reflection-free view of the scene must be absent any reflective aspects. For example, the scene itself may include reflection of some sort. Rather, the first, reflection free view is one that is obtained more directly by the lens as opposed to being obtained through the imaging tool. Ultimately, through such a tool and technique, a single image may be presented that simultaneously includes both of these views as indicated at 680. This image is three dimensionally viewable, for example with the aid of a viewer or perhaps via the user's own ability to "freeview".

Embodiments described hereinabove include techniques that allow for a user to take advantage of common stereographic three dimensional viewing via side-by-side scene views. This is also achieved without the requirement of more sophisticated measures such as computer assisted synchronization. Perhaps most notably, the three dimensional viewing may be of a scene that is self-determined by the user. That is, a three dimensionally viewable image may be generated in a practical, straight-forward manner by a user with his or her own personal mobile device that is already commonly carried by the user on an everyday basis. Only the addition or incorporation of an imaging tool, likely smaller in profile than the mobile device alone, is required to provide the device with such three dimensional image generating capacity.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, while certain types of freestyle and viewer assisted modes of viewing three dimensional viewable images are detailed other modes may be possible that employ techniques detailed herein. For example, a three dimensionally viewable image as described herein may be modified by an application of a mobile device to further enhance the three dimensional viewing experience. Furthermore, the foregoing description should not be read as pertaining only to the precise structures described and shown in the accompanying drawings, but rather should be read as consistent with and as support for the following claims, which are to have their fullest and fairest scope.

I claim:

1. An imaging tool for a single lens device to generate a three dimensionally viewable image, the imaging tool comprising:
    a first reflective surface positioned adjacent a lens of the device and angled thereover, the first reflective surface having a portion aligned with the lens at about a midline location thereof;
    a second reflective surface adjacent the first reflective surface, the lens to capture the three dimensionally viewable image, wherein the image comprises a first view of a scene free of the reflective surfaces and a second view of the scene via reflection therethrough.

2. The imaging tool of claim 1 wherein the reflective surfaces comprise opposite ends of a monolithic block comprising the imaging tool.

3. The imaging tool of claim 2 wherein the monolithic block is comprised of an optical grade acrylic-based material.

4. The imaging tool of claim 1 wherein the reflective surfaces comprise individual mirrors.

5. The imaging tool of claim 4 wherein the mirrors are configured for collapsing relative the single lens device.

6. The imaging tool of claim 5 further comprising hinges to support the collapsing, the hinges equipped with one of a bi-stable capacity and a spring loaded capacity.

7. The imaging tool of claim 4 wherein the single lens is located at an offset position of the device, the tool further comprising an even number of intermediate mirrors located between the reflective surfaces.

8. The imaging tool of claim 1 wherein the reflective surfaces are separated by less than about 1 inch.

9. The imaging tool of claim 1 wherein the reflective surfaces are separated by between about 2.25 inches and about 2.75 inches.

10. The imaging tool of claim 1 wherein the first reflective surface is concave and the second reflective surface is convex.

11. The imaging tool of claim 10 further comprising a wide angle lens adapter.

12. The imaging tool of claim 1 wherein the first reflective surface comprises a leading edge at the location adjacent the lens, the location being at about a midline of the lens, the three dimensional viewable image configured for viewer assisted viewing.

13. The imaging tool of claim 1 wherein the first reflective surface comprises a trailing edge for positioning over the location adjacent the lens, the location being at about the midline of the lens, the three dimensional viewable image configured for freestyle viewing.

14. A system for viewing a three dimensional image, the system comprising:
    a single lens mobile device having a lens for capturing a three dimensionally viewable image for display at a screen thereof;
    an imaging tool having first and second reflective surfaces adjacent one another, wherein the image comprises a first view of a scene free of the reflective surfaces and a second view of the scene via reflection therethrough; and
    a case about the mobile device with a securing mechanism for accommodating the imaging tool in a position adjacent the lens with the first reflective surface angled thereover to support generation of the second view.

15. The system of claim 14 wherein the mobile device is selected from a group consisting of a smartphone, a camera, a laptop and an electronic tablet.

16. The system of claim 14 further comprising a viewer to aid a user in viewing the three dimensionally viewable image in a three dimensional manner.

17. The system of claim 16 wherein the viewer is one of a stereoscope, a clip-on device for a pair of glasses and a parallax barrier.

18. A protective case for a single lens mobile device having a lens for capturing a three dimensionally viewable image for display at a screen thereof, the case comprising:
    a securing mechanism to accommodate an imaging tool with first and second reflective surfaces adjacent one another, the image comprising a first view of a scene free of the reflective surfaces and a second view of the scene via reflection therethrough; and at least one interface support for external access to a feature of the device through the case.

19. The protective case of claim 18 wherein the securing mechanism accommodates the tool via one of matching grooves, magnetic mounting and a snap-fit configuration.

20. The protective case of claim 18 wherein the interface support is one of an opening and a depressible locale of the case.

21. A method of generating a three dimensionally viewable image with a single lens device, the method comprising:

capturing a first view of a scene at one location through one side of the lens;

capturing a second view of the scene at an adjacent location through another side of the lens by aligning a given portion of a first reflective surface of an imaging tool with the lens at about a midline location thereof to acquire a reflection of the scene from a second reflective surface adjacent the first reflective surface; and simultaneously presenting the views together as the three dimensionally viewable image.

22. The method of claim 21 wherein the given portion of the imaging tool is one of a leading edge and a trailing edge of a first reflective surface of the tool.

23. The method of claim 22 wherein the given portion is the leading edge, the method further comprising using a viewer to assist viewing of the three dimensionally viewable image.

24. The method of claim 22 wherein the given portion is the trailing edge, the method further comprising a user viewing the image in a cross-eyed freestyle fashion.

25. The method of claim 21 further comprising utilizing an aluminum deposition technique to provide a reflective character to the surfaces of the imaging tool in advance of the capturing of the views.

26. The method of claim 22 further comprising sharpening the leading edge in advance of the capturing of the views.

* * * * *